(12) United States Patent
Takiguchi et al.

(10) Patent No.: US 8,051,304 B2
(45) Date of Patent: Nov. 1, 2011

(54) POWER SUPPLY APPARATUS WITH SYSTEM CONTROLLER

(75) Inventors: Iwao Takiguchi, Kanagawa (JP); Kazuaki Mitsui, Tokyo (JP); Tetsuji Tamura, Tokyo (JP); Atsuhiko Imai, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 883 days.

(21) Appl. No.: 12/064,303

(22) PCT Filed: Apr. 24, 2006

(86) PCT No.: PCT/JP2006/308583
§ 371 (c)(1),
(2), (4) Date: Apr. 1, 2008

(87) PCT Pub. No.: WO2007/032119
PCT Pub. Date: Mar. 22, 2007

(65) Prior Publication Data
US 2009/0037752 A1     Feb. 5, 2009

(30) Foreign Application Priority Data
Sep. 13, 2005  (JP) .................................. 2005-265892

(51) Int. Cl.
*G06F 1/00*     (2006.01)
*B23K 11/24*    (2006.01)
*B63H 23/24*    (2006.01)
*G01R 21/00*    (2006.01)
*H04M 1/00*     (2006.01)

(52) U.S. Cl. ........ 713/300; 713/320; 323/318; 363/178; 702/60; 455/574

(58) Field of Classification Search .................. 713/300, 713/320; 323/318; 363/178; 702/60; 455/574
See application file for complete search history.

(56) References Cited

U.S. PATENT DOCUMENTS 5,852,737 A * 12/1998 Bikowsky ..................... 713/323
6,425,086 B1    7/2002 Clark et al.
(Continued)

FOREIGN PATENT DOCUMENTS
JP    02161583 A    6/1990
(Continued)

OTHER PUBLICATIONS

International Search report and Written opinion for corresponding application PCT/JP2006/308583.

(Continued)

*Primary Examiner* — Stefan Stoynov
(74) *Attorney, Agent, or Firm* — Matthew B. Dernier, Esq.; Gibson & Dernier, LLP

(57) ABSTRACT

In a power supply apparatus for supplying a target power supply voltage to a microprocessor, a system controller sets the target power supply voltage to be supplied to the microprocessor based on a voltage configuration signal outputted from the microprocessor and outputs a voltage setting signal corresponding to the target power supply voltage. The regulator circuit generates the target power supply voltage set by the system controller based on the voltage setting signal outputted from the system controller and supplies the voltage to the microprocessor 10. The system controller acquires the conditions of the microprocessor, such as the operating time and temperature of the microprocessor and the amount of computation in the microprocessor, and reflects the acquired conditions on the setting of the power supply voltage.

16 Claims, 6 Drawing Sheets

U.S. PATENT DOCUMENTS

| | | | |
|---|---|---|---|
| 7,098,635 B2 * | 8/2006 | Burton | 323/266 |
| 7,120,804 B2 * | 10/2006 | Tschanz et al. | 713/300 |
| 2006/0049886 A1 * | 3/2006 | Agostinelli et al. | 331/175 |

FOREIGN PATENT DOCUMENTS

| JP | 11203163 A | 7/1999 |
|---|---|---|
| JP | 2000259288 A | 9/2000 |
| JP | 2002543513 A | 12/2002 |
| JP | 2003256069 A1 | 9/2003 |
| JP | 2005134531 A | 5/2005 |
| JP | 2006332131 A | 12/2006 |
| JP | 2005503744 A1 | 5/2008 |
| WO | 02101529 A3 | 12/2002 |

OTHER PUBLICATIONS

International Preliminary Report on Patentability for corresponding application PCT/JP2006/308583.

Japanese Office Action for corresponding Japanese Application No. 2005-265892, Jul. 6, 2010.

* cited by examiner

POWER SUPPLY APPARATUS WITH SYSTEM CONTROLLER

BACKGROUND OF THE INVENTION

1. Field of the Invention

This invention relates to a power supply apparatus for supplying a power supply voltage to a microprocessor such as a CPU.

2. Description of the Related Art

A predetermined power supply voltage stabilized by a voltage regulator circuit (hereinafter simply referred to as a regulator circuit) is supplied to a microprocessor, such as a CPU, used in personal computers, workstations, game machines, and the like. A target power supply voltage to be supplied to a microprocessor is set according to a semiconductor manufacturing process or the like of the microprocessor. The power supply voltage of recent microprocessors manufactured using a low voltage process is about 1.2 V.

Currently, various types of microprocessors are supplied from different vendors. The microprocessors supplied from each vendor provide an instruction for the target power supply voltage to be supplied thereto to a regulator circuit by means of a unique method. In other words, the regulator circuit is designed to be capable of receiving the instruction regarding the target power supply voltage from the microprocessors. FIG. 6 is a block diagram illustrating an example of a conventional configuration of a microprocessor and a regulator circuit.

As shown in FIG. 6, a microprocessor 60 is connected to a regulator circuit 62 through, for example, a 5-bit parallel signal line 64. The microprocessor 60 sends a VID (Voltage ID) signal through the signal line 64 to provide an instruction for a target power supply voltage Vdd to be supplied thereto to the regulator circuit 62. The regulator circuit 62 generates the target power supply voltage Vdd designated by the microprocessor 60 and supplies the voltage to the microprocessor 60 through a power supply line 66. By employing such a configuration, when a user replaces the microprocessor 60 with another microprocessor 60 after a device having the microprocessor 60 and the regulator circuit 62 mounted thereon (hereinafter such a device is simply referred to as a set) is shipped, an optimal power supply voltage Vdd can be supplied to the replaced microprocessor 60.

However, with conventional technologies, when a set manufacturer selects a vendor of a microprocessor 10 to be used, the set manufacturer must select a regulator circuit 12 which is adaptable to the microprocessor 10 supplied from that vendor, and therefore design flexibility is limited. In addition, the resolution of the power supply voltage Vdd is limited by the number of bits of the VID signal sent to the regulator circuit 62 through the signal line 64, and this poses a problem in that the voltage cannot be finely adjusted.

SUMMARY OF THE INVENTION

It is a general purpose of the present invention to provide a power supply apparatus capable of flexibly setting a target power supply voltage to be supplied to a microprocessor.

One embodiment of the present invention provides a power supply apparatus for supplying a power supply voltage to a microprocessor. This power supply apparatus includes: a system controller which sets a target power supply voltage to be supplied to the microprocessor based on a voltage configuration signal outputted from the microprocessor and outputs a voltage setting signal corresponding to the target power supply voltage; and a regulator circuit which generates the target power supply voltage set by the system controller, based on the voltage setting signal outputted from the system controller, and supplies the target power supply voltage to the microprocessor.

In the power supply apparatus according to this embodiment, the system controller is provided in the power supply apparatus, and the target power supply voltage is set not by the regulator circuit but by the system controller. In this manner, a power supply voltage appropriate to the circumstances can be supplied to the microprocessor.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
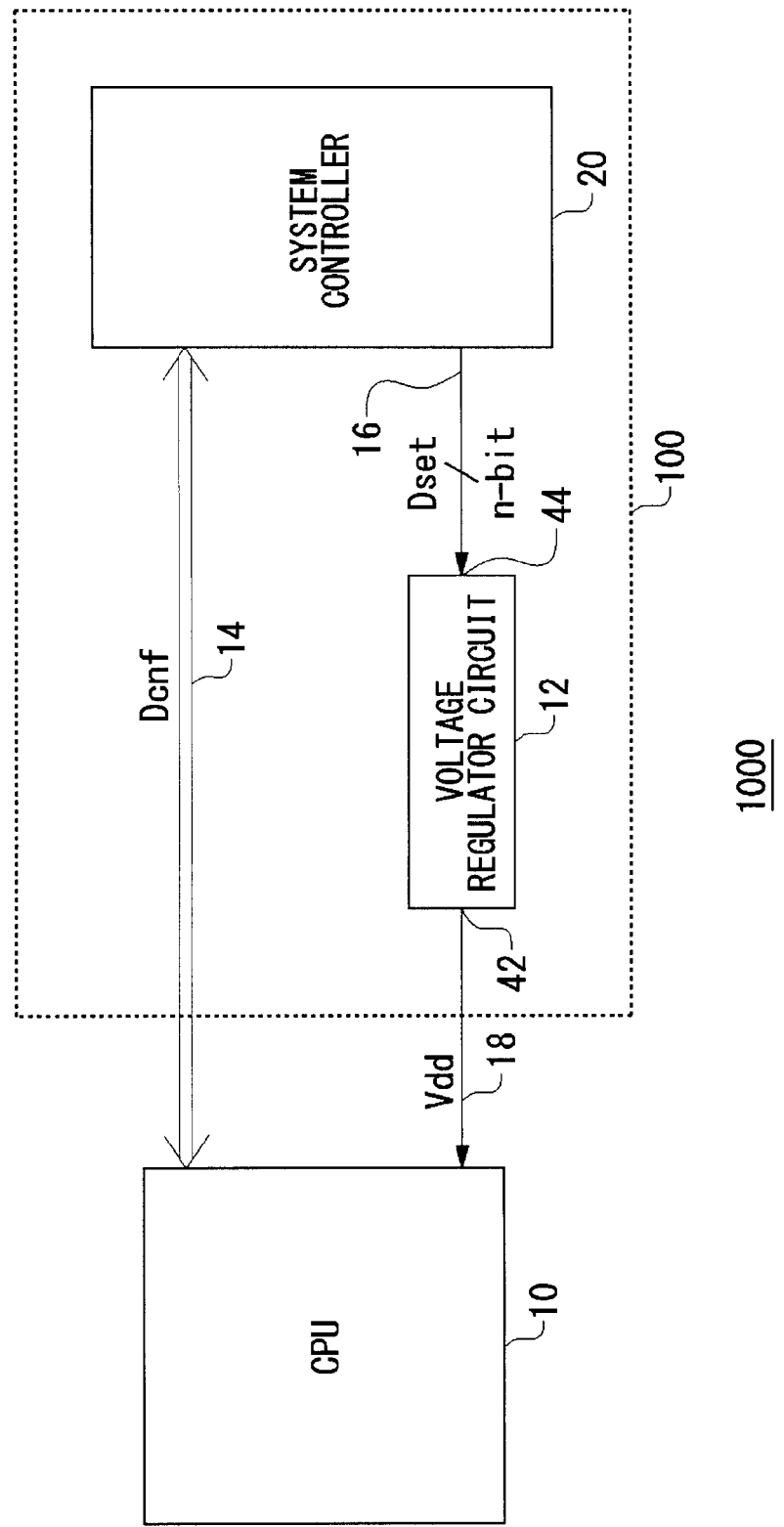
FIG. 1 is a block diagram showing the configuration of a microprocessor and a power supply apparatus according to a first embodiment for supplying a power supply voltage to the microprocessor.

First, a description will be given of the outline of power supply apparatuses according to embodiments of the present invention. Each of these power supply apparatuses is to be mounted on an electronic device such as a personal computer or a game machine and to supply a power supply voltage to a microprocessor.

A power supply apparatus of one embodiment includes: a system controller which sets a target power supply voltage to be supplied to a microprocessor based on a voltage configuration signal outputted from the microprocessor and outputs a voltage setting signal corresponding to the target power supply voltage; and a regulator circuit which generates the target power supply voltage set by the system controller, based on the voltage setting signal outputted from the system controller, and supplies the target power supply voltage to the microprocessor.

According to this embodiment, because the target power supply voltage is set by the system controller, a power supply voltage appropriate to the circumstances can be supplied to the microprocessor.

The system controller may include a voltage setting table which holds the relationship between the voltage configuration signal and the target power supply voltage to be supplied to the microprocessor. The voltage setting table may be configured such that data held therein can be updated.

The system controller may acquire conditions of the microprocessor and may reflect the acquired conditions on the setting of the target power supply voltage.

The conditions of the microprocessor include, for example, the operating time and temperature of the microprocessor and the amount of computation in (the computational load on) the microprocessor. By using these as parameters, an optimal power supply voltage can be set according to the conditions of the microprocessor at that moment.

The system controller and the microprocessor may be connected to each other through a bus. An SPI (Serial Peripheral Interface) bus or an I2C bus may preferably be used as the above bus, so that a large amount of information can be transmitted or received.

The microprocessor may communicate through the bus to dynamically set the target power supply voltage. The expression "dynamically setting" does not mean that a fixed power supply voltage initially set by the system controller is continuously supplied to the microprocessor, but rather that the target power supply voltage is set according to the conditions of the microprocessor or a device on which the power supply apparatus is mounted.

The regulator circuit may generate the target power supply voltage based on the voltage setting signal inputted as a digital signal, and the system controller and the regulator circuit may be connected to each other through a digital signal line.

In this case, a conventional regulator circuit used for supplying electric power to a microprocessor may be used.

The regulator circuit may generate the target power supply voltage based on the voltage setting signal inputted as an analog signal, and the power supply apparatus may further include a digital-to-analog converter which converts the voltage setting signal in digital form outputted from the system controller to an analog voltage setting signal and outputs the analog voltage setting signal to the regulator circuit.

In this case, a general-purpose regulator circuit may be used which sets its output voltage based on an analog input voltage.

The power supply apparatus may further include an analog-to-digital converter which converts a power supply voltage supplied to the microprocessor from analog to digital. The system controller may include an electric power computing unit which computes the power consumption of the microprocessor using an output signal from the analog-to-digital converter and the voltage setting signal outputted to the regulator circuit.

By comparing the target power supply voltage to be supplied to the microprocessor, which is set by the system controller, with the voltage actually supplied to the microprocessor, a current flowing into the microprocessor can be computed when the impedance of the power supply line is known.

Hereinafter, the details of power supply apparatuses according to the embodiments of the present invention will be described with reference to the drawings.

First Embodiment

FIG. 1 is a block diagram showing the configuration of an electronic device 1000 according to a first embodiment. The electronic device 1000 includes: a microprocessor 10 such as a CPU or a graphic processor; and a power supply apparatus 100 which supplies a power supply voltage Vdd to the microprocessor 10. In the subsequent drawings, the same or similar components are designated by the same reference numerals, and the description thereof will be omitted as appropriate. The microprocessor 10 driven by the power supply apparatus 100 is typically operated at a power supply voltage of about 1.2 V. However, in practice, the optimal power supply voltage Vdd varies depending on various factors such as the details of executed computational processing, the temperature of the microprocessor 10, and the period of use after implementation. Hereinafter, the power supply apparatus 100 for supplying the optimal power supply voltage Vdd to the microprocessor 10 is described based on some embodiments.

Hereinafter, the configuration of the power supply apparatus 100 according to the first embodiment will be described. The power supply apparatus 100 includes a regulator circuit 12 and a system controller 20. The system controller 20 and the microprocessor 10 are connected to each other through a first signal line 14. A voltage configuration signal Dcnf outputted from the microprocessor 10 is inputted to this system controller 20 through the first signal line 14. The system controller 20 sets the optimal power supply voltage Vdd required by the microprocessor 10, based on the voltage configuration signal Dcnf. As described later, the system controller 20 acquires the conditions of the microprocessor 10, and the acquired conditions are reflected on the setting of the power supply voltage Vdd.

The system controller 20 and the regulator circuit 12 are connected to each other through an n-bit second signal line 16. The system controller 20 outputs the optimal power supply voltage, which is set based on the voltage configuration signal Dcnf, to the regulator circuit 12 as an n-bit digital voltage setting signal Dset.

An n-bit input terminal 44 is provided in the regulator circuit 12, and the regulator circuit 12 generates the analog power supply voltage Vdd according to the signal inputted to the input terminal 44 and outputs the analog power supply voltage Vdd from an output terminal 42. The regulator circuit 12 used in this embodiment has a function similar to that in the conventional regulator circuit 62 shown in FIG. 6.

The voltage setting signal Dset is inputted to the input terminal 44 of the regulator circuit 12 through the second signal line 16. Specifically, upon reception of the instruction from the system controller 20, the regulator circuit 12 generates the optimal power supply voltage Vdd set by the system controller 20. The power supply voltage Vdd outputted from the output terminal 42 of the regulator circuit 12 is supplied to the microprocessor 10 through a power supply line 18.

Figure 2:
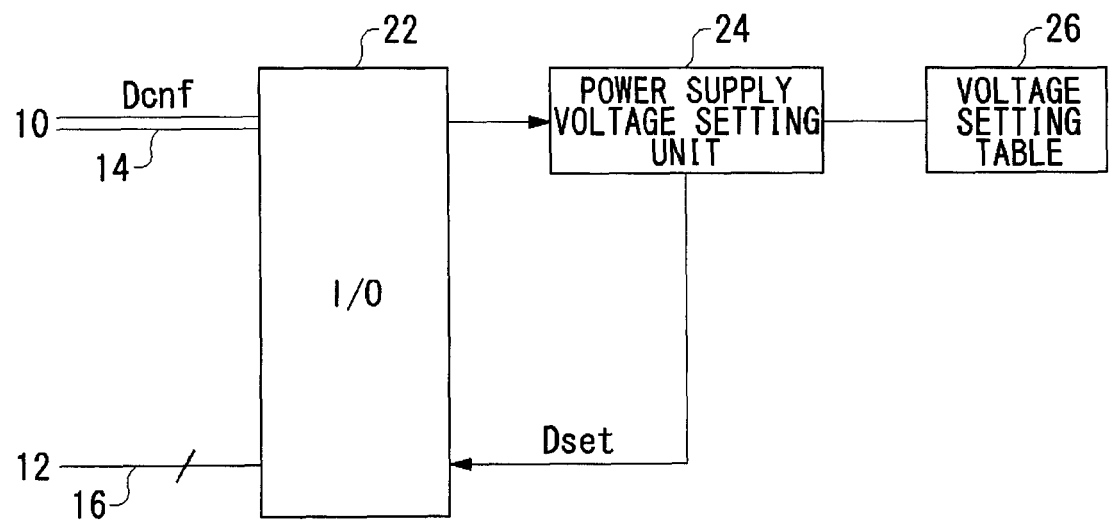
FIG. 2 is a block diagram showing the internal structure of a system controller.

FIG. 2 is a block diagram showing the internal structure of the system controller 20. The system controller 20 includes an interface unit 22, a power supply voltage setting unit 24, and a voltage setting table 26. The interface unit 22 controls the transmission and receipt of signals between the power supply voltage setting unit 24 and each of blocks, such as the microprocessor 10 and the regulator circuit 12, connected outside the system controller 20. For example, the first signal line 14 connecting the microprocessor 10 and the system controller 20 to each other may be an SPI bus. In this case, the microprocessor 10 and the system controller 20 are connected to each other through four signal lines corresponding to data-in, data-out, clock, and chip select, respectively. When the microprocessor 10 and the system controller 20 are connected to each other through the SPI bus, the interface unit 22 performs signal processing appropriate for the SPI and transfers the voltage configuration signal Dcnf to the power supply voltage setting unit 24. Note that an I2C bus or the like may be used in place of the SPI bus.

The voltage configuration signal Dcnf in digital form outputted from the microprocessor 10 is inputted to the power supply voltage setting unit 24. Furthermore, the power supply voltage setting unit 24 is connected to the voltage setting table 26. The voltage setting table 26 holds the relationship between the digital voltage configuration signal Dcnf and the optimal target power supply voltage Vdd to be supplied to the microprocessor 10, with the conditions of devices including the power supply apparatus 100 as parameters.

The power supply voltage setting unit 24 of the system controller 20 references the voltage setting table 26 using the voltage configuration signal Dcnf and sets the optimal power supply voltage Vdd according to the conditions of the set. A description will now be given of methods for setting the power supply voltage Vdd based on the voltage configuration signal Dcnf by means of the system controller 20.

(Setting Method 1)

For example, the relationship between the voltage configuration signal Dcnf and the target power supply voltage Vdd to be supplied to the microprocessor 10 is stored in the voltage setting table 26 with an elapsed time $\tau$ after shipment of the set having the power supply apparatus 100 mounted thereon as a parameter.

The microprocessor 10 is formed by integrating a large number of transistor elements called gates. It is known that the level of power supply voltage providing stable operation of these transistor elements gradually increases due to deterioration over time. Hence, in a conventional technique for supplying electric power to a microprocessor, a power supply voltage higher than actually necessary must be supplied in an initial state in consideration of the deterioration over time. This means that additional electric power is consumed by the microprocessor 10.

Figure 3:
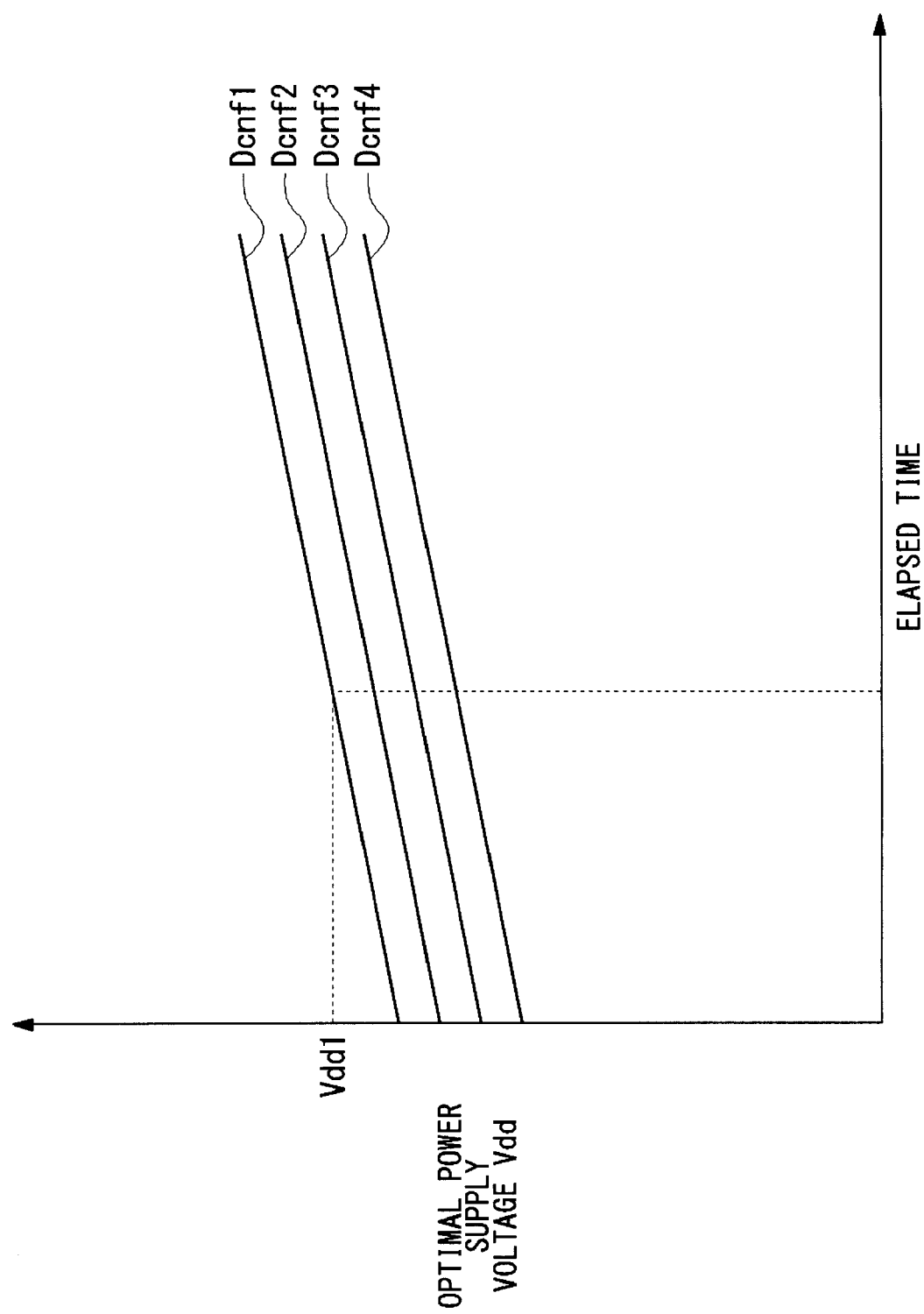
FIG. 3 is a graph showing the relationship among a voltage configuration signal Dcnf in digital form, an elapsed time τ, and an optimal power supply voltage Vdd and showing the contents of a voltage setting table.

By contrast, in the power supply apparatus 100 according to the present embodiment, the system controller 20 manages the elapsed time $\tau$ after shipment and gradually increases the setting value of the target power supply voltage Vdd to be supplied to the microprocessor 10 according to the elapsed time. FIG. 3 is a graph showing the relationship among the voltage configuration signal Dcnf in digital form, the elapsed time $\tau$, and the optimal power supply voltage Vdd, and showing the contents of the voltage setting table 26.

The digital voltage configuration signal Dcnf having been preset for each processor type, the processor lot, or a specific processor itself is outputted from the microprocessor 10. The system controller 20 references the voltage setting table 26 using the elapsed time $\tau$ after shipment and the voltage configuration signal Dcnf and determines the optimal power supply voltage Vdd. For example, when a voltage configuration signal Dcnf1 is outputted from a microprocessor 10 and the elapsed time is $\tau 1$, the optimal power supply voltage is Vdd1. The values of the optimal power supply voltages Vdd are stored in the voltage setting table 26 as n-bit digital values, and the power supply voltage setting unit 24 outputs one of the digital values to the regulator circuit 12 as the digital voltage setting signal Dset.

As described above, according to this setting method, by adjusting the power supply voltage Vdd according to the elapsed time $\tau 1$ after shipment of the set, a power supply voltage higher than necessary need not be supplied so that power consumption can be reduced.

The elapsed time $\tau$ after shipment of the set may be managed and acquired by the system controller 20 itself, may be managed by the microprocessor 10 and acquired through the first signal line 14, or may be acquired from an external processing block.

In addition, the system controller 20 may manage the integrated operating time of the microprocessor 10 in place of the elapsed time $\tau$ after shipment to set the power supply voltage Vdd.

(Setting Method 2)

In setting method 2, the amount of computational processing in (the computational load on) the microprocessor 10 is monitored, and the power supply voltage Vdd is set to the optimal value according to the computational load. The computational load on the microprocessor 10 is inputted together with the voltage configuration signal Dcnf from the microprocessor 10 through the first signal line 14. When an SPI bus or I2C bus is used as the first signal line 14 as described above, such additional information can be transmitted and received.

In this setting method, the voltage configuration signal Dcnf and a computational load signal SigL representing the computational load are outputted from the microprocessor 10 to the power supply voltage setting unit 24. The relationship among the computational load signal SigL, the voltage configuration signal Dcnf, and the power supply voltage Vdd is stored in the voltage setting table 26. The power supply voltage setting unit 24 references the voltage setting table 26, determines the voltage setting signal Dset based on the computational load signal SigL and the voltage configuration signal Dcnf at that moment, and provides an instruction to the regulator circuit 12.

According to this setting method, the power supply voltage Vdd can preferably be controlled according to the amount of computation in the microprocessor 10 and the operation clock of the microprocessor 10.

(Setting Method 3)

In this setting method, the system controller 20 monitors the temperature TH of the microprocessor 10 and adjusts the target power supply voltage Vdd to be supplied to the microprocessor 10 according to the temperature of the microprocessor 10. The temperature TH of the microprocessor 10 can be acquired as a voltage signal (hereinafter referred to as a temperature detection signal Vth) by means of a temperature detection circuit using, for example, a thermistor. The temperature detection signal Vth is converted to a digital value by the interface unit 22 or an external A-D converter and thereafter inputted to the power supply voltage setting unit 24.

The relationship between the voltage configuration signal Dcnf and the power supply voltage Vdd is stored in the voltage setting table 26 with the temperature TH of the microprocessor 10 as a parameter. The power supply voltage setting unit 24 references the voltage setting table 26 and thereby can provide an instruction for the optimal power supply voltage Vdd to the regulator circuit 12.

(Setting Method 4)

In terms of reducing the power consumption of the set, it is desirable to set the target power supply voltage Vdd to be supplied to the microprocessor 10 as low as possible within the operable range of the microprocessor 10. Hence, in setting method 4, the optimal power supply voltage Vdd is dynamically set while the power supply voltage setting unit 24 and the microprocessor 10 communicate bidirectionally with each other.

Specifically, the optimal power supply voltage Vdd is set by operating the power supply voltage setting unit 24 and the microprocessor 10 as follows.

First, the power supply voltage setting unit 24 sets an initial power supply voltage VddINIT. Desirably, this initial power supply voltage VddINIT is set to a value which ensures the operation of the microprocessor 10.

The power supply voltage setting unit 24 outputs the voltage setting signal Dset corresponding to the set initial power supply voltage VddINIT to the regulator circuit 12. The regulator circuit 12 generates the initial power supply voltage VddINIT based on the inputted voltage setting signal Dset and outputs the generated voltage to the microprocessor 10.

The microprocessor 10 outputs an enable signal EN which indicates whether the microprocessor 10 can be stably operated with the initial power supply voltage VddINIT applied thereto to the power supply voltage setting unit 24 through the first signal line 14. The enable signal EN represents an operable state when at a high level (1), and an inoperable state when at a low level (0). When the enable signal EN is at the high level, the power supply voltage setting unit 24 shifts the voltage setting signal Dset in a direction for reducing the power supply voltage Vdd and outputs the signal to the regulator circuit 12. Consequently, a power supply voltage lower than the initial power supply voltage VddINIT is supplied to the microprocessor 10.

The microprocessor 10 determines whether it can be operated at the current power supply voltage Vdd and sends an enable signal EN to the power supply voltage setting unit 24. At this time, the power supply voltage setting unit 24 further decreases the power supply voltage Vdd when the enable signal EN is at the high level and, conversely, increases the power supply voltage Vdd when the enable signal EN is at the low level.

In this setting method, the above procedure is repeated by the microprocessor 10 and the system controller 20, whereby a minimum power supply voltage Vdd allowing the microprocessor 10 to be operated can be set. In addition, when this method is used, the voltage setting table 26 may not be provided.

As described above, in the power supply apparatus 100 according to the present embodiment, the power supply voltage Vdd is set not by the regulator circuit 12, but by the system controller 20. Therefore, an appropriate power supply voltage can be supplied to the microprocessor 10 according to the conditions of the set.

Figure 6:
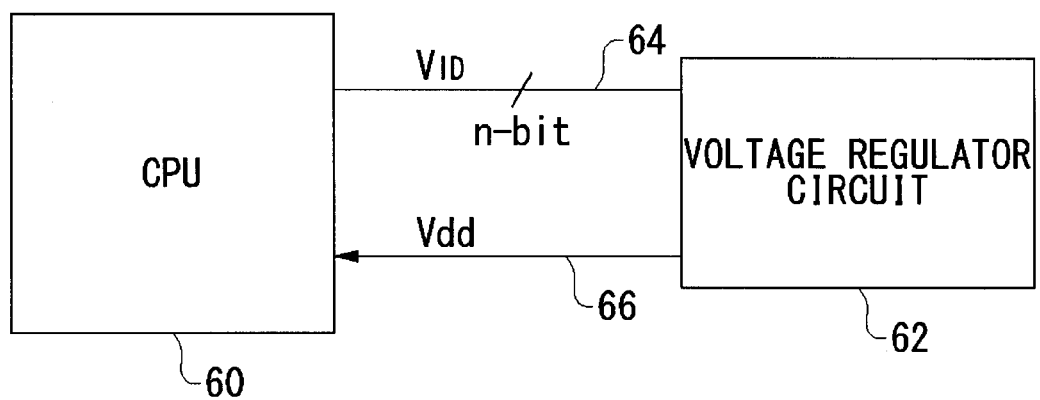
FIG. 6 is a block diagram showing an example of the conventional configuration of a microprocessor and a regulator circuit.

In addition, when the microprocessor 10 and the system controller 20 are connected to each other through an SPI bus or an I2C bus, the n-bit signal line provided in the conventional power supply apparatus shown in FIG. 6 for the output from the microprocessor 10 need not be provided. Therefore, the number of pins of the microprocessor 10 can be reduced.

The setting methods described in setting methods 1 to 4 may be used alone or in any combination thereof. A more optimal power supply voltage Vdd can be set by comprehensively analyzing a plurality of factors such as the elapsed time τ after shipment, the temperature TH of the microprocessor 10, and the computational load on the microprocessor 10 by means of the system controller 20.

The voltage setting table 26 provided in the system controller 20 may be configured so as to be updatable. For example, when a set having the power supply apparatus 100 mounted thereon has a function of networking with personal computers and game machines, data for a new setting table can be downloaded by connecting the set to a network through a LAN (Local Area Network) or the like. The system controller 20 rewrites the contents of the voltage setting table 26 based on the downloaded data. By updating the voltage setting table 26 in accordance with need, problems can be corrected, and the power supply voltage can be set to a more suitable value. In addition, the voltage setting table 26 may be updated using a medium such a CD-ROM or a flexible disk.

Second Embodiment

In the first embodiment, the power supply apparatus 100 has been described which uses the regulator circuit 12 of a type in which the output voltage is set by means of a digital signal. In a second embodiment described below, a description will be given of a power supply apparatus 110 in which a regulator circuit capable of setting the output voltage by means of an analog voltage is used.

Figure 4:
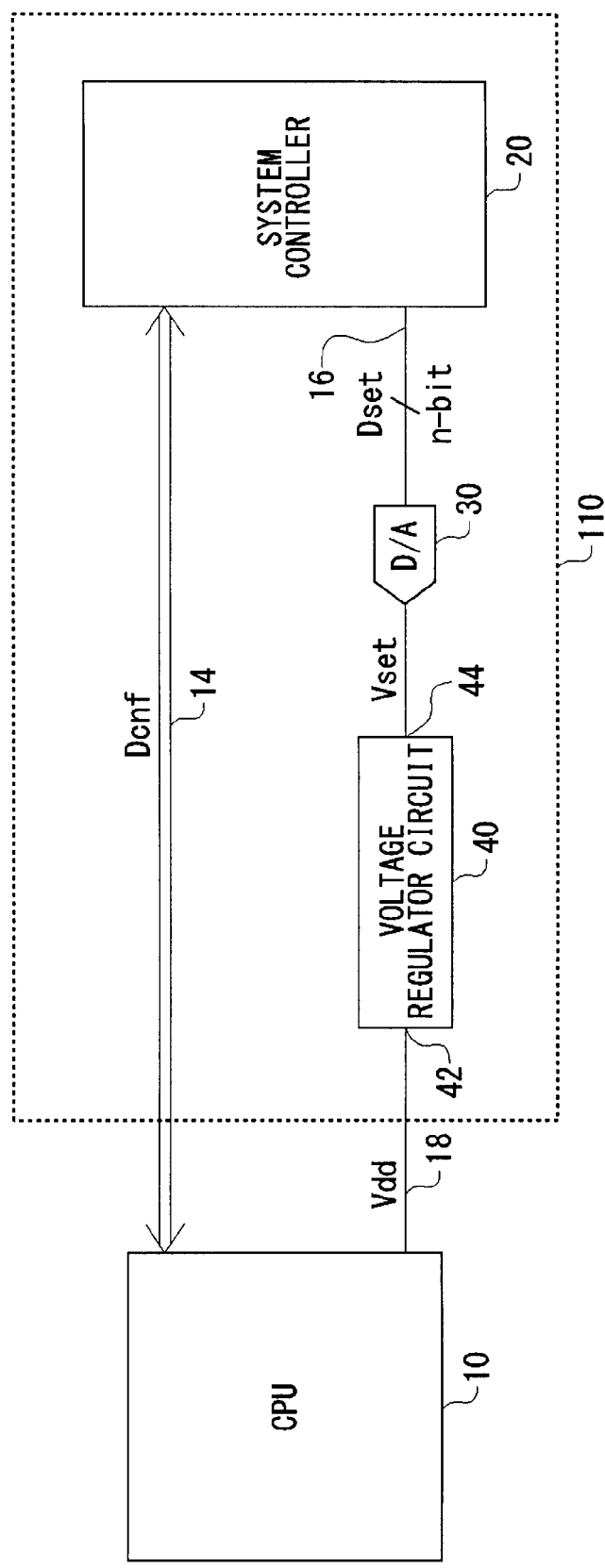
FIG. 4 is a block diagram showing the configuration of a power supply apparatus according to a second embodiment.

FIG. 4 is a block diagram showing the configuration of the power supply apparatus 110 according to the second embodiment. The power supply apparatus 110 includes a regulator circuit 40, a D-A converter 30, and the system controller 20. Since the configuration of the system controller 20 and the connection structure to the microprocessor 10 are the same as those in the first embodiment, the description thereof will be omitted.

The n-bit digital voltage setting signal Dset outputted from the system controller 20 through the second signal line 16 is inputted to the D-A converter 30. The D-A converter 30 converts the voltage setting signal Dset from digital to analog to form an analog voltage setting signal Vset. The voltage setting signal Vset outputted from the D-A converter 30 is inputted to an input terminal 44 of the regulator circuit 40.

The regulator circuit 40 generates the power supply voltage Vdd according to the voltage setting signal Vset inputted to the input terminal 44 and outputs the power supply voltage Vdd to the microprocessor 10 through the power supply line 18.

In the present embodiment, a general purpose regulator circuit can be used. In addition, by increasing the number of bits of the digital voltage setting signal Dset outputted from the system controller 20, the output voltage of the regulator circuit, or the power supply voltage Vdd to be supplied to the microprocessor 10, can be more finely adjusted as compared to that in a conventional power supply apparatus.

Third Embodiment

Figure 5:
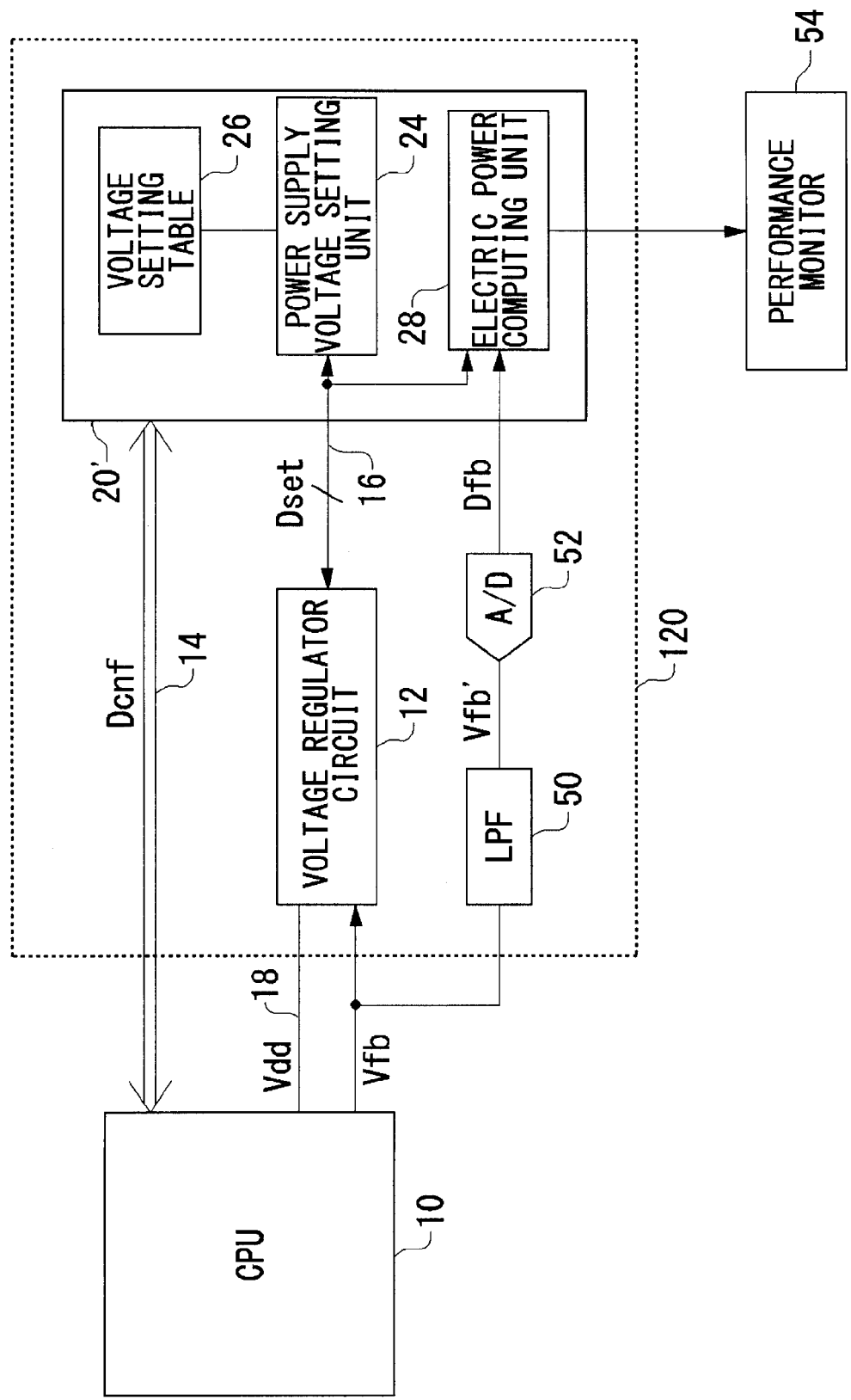
FIG. 5 is a block diagram showing the configuration of a power supply apparatus according to a third embodiment.

FIG. 5 is a block diagram showing the configuration of a power supply apparatus 120 according to a third embodiment. The power supply apparatus 120 according to the present embodiment has a function of computing the current consumption and power consumption of the microprocessor 10.

The power supply apparatus 120 according to the present embodiment includes a system controller 20', the regulator circuit 12, a low-pass filter 50, and an A-D converter 52.

A general regulator circuit 12 performs feedback control such that a voltage to be controlled, or the power supply voltage Vdd, approaches a target value designated by the voltage setting signal Dset. In the present embodiment, the power supply voltage Vdd actually applied to the microprocessor 10 is returned to the regulator circuit 12 as a feedback voltage Vfb. The regulator circuit 12 generates a voltage such that the feedback voltage Vfb approaches the target value.

The feedback voltage Vfb is inputted to the A-D converter 52 through the low-pass filter 50. The feedback voltage Vfb is smoothed by removing high frequency components and thereafter converted to a digital feedback signal Dfb through the A-D converter 52. The feedback signal Dfb is then inputted to the system controller 20'.

The system controller 20' in the present embodiment includes an electric power computing unit 28 in addition to the components shown in FIG. 2. The voltage setting signal Dset outputted from the power supply voltage setting unit 24 and the feedback signal Dfb outputted from the A-D converter 52 are inputted to the electric power computing unit 28, and the electric power computing unit 28 computes the current consumption and power consumption in the microprocessor 10 based on the two signals.

The power supply voltage Vdd generated by the regulator circuit 12 is applied to the microprocessor 10 through the power supply line 18. Since the power supply line 18 has a low electric resistance RL, a voltage drop ΔV is generated through the flow of a load current IL. The relationship IL=ΔV/RL holds between the voltage drop ΔV and electric resistance RL, and the load current IL.

In the present embodiment, the voltage drop ΔV in the power supply line 18 can be determined by ΔV=Vdd−Vfb. Here, Vdd is a voltage value designated by the voltage setting signal Dset, and Vfb is a voltage actually applied to the microprocessor 10. The electric power computing unit 28 computes the voltage drop ΔV using the voltage setting signal Dset corresponding to Vdd and the feedback signal Dfb corresponding to Vfb.

The resistance RL of the power supply line 18 is measured in advance. The electric power computing unit 28 computes the electric current flowing through the microprocessor 10 using the above relational expression with the resistance RL and the voltage drop ΔV determined from the voltage setting signal Dset and the feedback signal Dfb.

For example, when the voltage setting signal Dset gives a value corresponding to 1.2 V and the feedback signal Dfb gives a value corresponding to 1.08 V, the voltage drop is ΔV=0.12 V. When the resistance value of the power supply line 18 is RL=1.2 mΩ, the current consumption IL in the microprocessor 10 is IL=0.12 V/1.2 mΩ=100 A. Furthermore, the power consumption is P=I×V=100 A×1.2 V=120 W.

The electric power computing unit 28 outputs the thus-computed current consumption and power consumption of the microprocessor 10 to a performance monitor 54 connected externally. A user can learn the operating conditions of the microprocessor 10 through the performance monitor 54.

As described above, in the power supply apparatus 120 according to the present embodiment, the electric power computing unit 28 is provided in the system controller 20', and a voltage at a point on the path for driving the microprocessor 10 is inputted to the electric power computing unit 28 to determine the voltage drop. In this manner, the current consumption or power consumption of the microprocessor 10 can be computed.

Moreover, the current consumption or power consumption of the microprocessor 10 computed in the power supply apparatus 120 according to the present embodiment may be reflected on the setting of the target power supply voltage Vdd to be supplied to the microprocessor 10, as described in the first embodiment.

The present invention has been described hereinabove based on the embodiments. The embodiments are exemplary, and it is understood by those skilled in the art that various modifications to the combination of each component and each process thereof are possible and that such modifications are also within the scope of the present invention.

In the embodiments, the system controller 20 performs processing for controlling the regulator circuit 12. However, the system controller 20 may be allowed to perform different processing. For example, when the temperature information of the microprocessor 10 is acquired by the system controller 20, the system controller 20 may control a fan for cooling the microprocessor 10. In addition, by connecting the system controller 20 to another block, comprehensive processing can be performed.

While the preferred embodiments of the present invention have been described using specific terms, such description is for illustrative purposes only, and it is to be understood that changes and variations may be made without departing from the spirit or scope of the appended claims.

What is claimed is:

1. A power supply apparatus for supplying a power supply voltage to a microprocessor, comprising:
   a system controller which sets a target power supply voltage to be supplied to the microprocessor based on a voltage configuration signal outputted from the microprocessor and outputs a voltage setting signal corresponding to the set target power supply voltage; and
   a regulator circuit which generates the target power supply voltage set by the system controller, based on the voltage setting signal outputted from the system controller, and supplies the target power supply voltage to the microprocessor, wherein
   the system controller acquires an operating time of the microprocessor and reflects the obtained time on the setting of the target power supply voltage,
   the system controller and the microprocessor are connected to each other through a bus such that the system controller gradually lowers the setting value of the target power supply voltage,
   the microprocessor transmits an enable signal, which indicates whether the microprocessor can be operated with the power supply voltage applied thereto, to the system controller through the bus, and
   the system controller dynamically sets the target power supply voltage based on the enable signal.

2. The power supply apparatus according to claim 1, wherein the system controller comprises a voltage setting table which holds the relationship between the voltage configuration signal and the target power supply voltage to be supplied to the microprocessor.

3. The power supply apparatus according to claim 2, wherein the voltage setting table is configured such that data held therein can be updated.

4. The power supply apparatus according to claim 2, wherein the operation clock of the microprocessor remains constant.

5. The power supply apparatus according to claim 1, wherein the operation clock of the microprocessor remains constant.

6. The power supply apparatus according to claim 1, wherein the frequency of operation clock of the microprocessor is fixed, and
   the system controller acquires an amount of computation in the microprocessor in addition to the operating time of the microprocessor and reflects the obtained amount on the setting of the target power supply voltage.

7. The power supply apparatus according to claim 1, wherein:
   the regulator circuit generates the target power supply voltage based on the voltage setting signal inputted as a digital signal; and
   the system controller and the regulator circuit are connected to each other through a digital signal line.

8. The power supply apparatus according to claim 1, wherein:
   the regulator circuit generates the target power supply voltage based on the voltage setting signal inputted as an analog signal; and
   the power supply apparatus further comprises a digital-to-analog converter which converts the voltage setting signal in digital form outputted from the system controller to an analog voltage setting signal and outputs the analog voltage setting signal to the regulator circuit.

9. A power supply apparatus comprising:
a system controller which sets a target power supply voltage to be supplied to a microprocessor based on a voltage configuration signal outputted from the microprocessor and outputs a voltage setting signal corresponding to the set target power supply voltage;
a regulator circuit which generates the target power supply voltage set by the system controller, based on the voltage setting signal outputted from the system controller, and supplies the target power supply voltage to the microprocessor, wherein the system controller acquires an operating time of the microprocessor and reflects the obtained time on the setting of the target power supply voltage; and
an analog-to-digital converter which converts a power supply voltage supplied to the microprocessor from analog to digital, wherein
the system controller includes an electric power computing unit which computes a power consumption in the microprocessor using an output signal from the analog-to-digital converter and the voltage setting signal outputted to the regulator circuit.

10. The power supply apparatus according to claim 9, wherein the system controller comprises a voltage setting table which holds the relationship between the voltage configuration signal and the target power supply voltage to be supplied to the microprocessor.

11. The power supply apparatus according to claim 10, wherein the voltage setting table is configured such that data held therein can be updated.

12. The power supply apparatus according to claim 9, wherein the operation clock of the microprocessor remains constant.

13. The power supply apparatus according to claim 9, wherein the frequency of operation clock of the microprocessor is fixed, and the system controller acquires an amount of computation in the microprocessor in addition to the operating time of the microprocessor and reflects the obtained amount on the setting of the target power supply voltage.

14. The power supply apparatus according to claim 9, wherein:
the regulator circuit generates the target power supply voltage based on the voltage setting signal inputted as a digital signal; and
the system controller and the regulator circuit are connected to each other through a digital signal line.

15. The power supply apparatus according to claim 9, wherein:
the regulator circuit generates the target power supply voltage based on the voltage setting signal inputted as an analog signal; and
the power supply apparatus further comprises a digital-to-analog converter which converts the voltage setting signal in digital form outputted from the system controller to an analog voltage setting signal and outputs the analog voltage setting signal to the regulator circuit.

16. An electronic device, comprising:
a microprocessor; and
the power supply apparatus according to claim 1, the power supply apparatus supplying a power supply voltage to the microprocessor.

* * * * *